United States Patent [19]
Foschini et al.

[11] 4,111,835
[45] Sep. 5, 1978

[54] CATALYSTS FOR POLYMERIZING OLEFINS TO SPHEROIDAL-FORM POLYMERS

[75] Inventors: Giorgio Foschini; Nicolino Fiscelli; Paolo Galli, all of Ferrara, Italy

[73] Assignee: Montedison S.p.A., Milan, Italy

[21] Appl. No.: 724,362

[22] Filed: Sep. 17, 1976

[30] Foreign Application Priority Data

Sep. 18, 1975 [IT] Italy ................................ 27385 A/75

[51] Int. Cl.² .......................... C08F 4/02; C08F 4/10
[52] U.S. Cl. ........................... 252/429 C; 252/429 B; 252/441; 526/125
[58] Field of Search ................ 252/429 B, 429 C, 441

[56] References Cited

U.S. PATENT DOCUMENTS

| | | | |
|---|---|---|---|
| 3,594,330 | 7/1971 | Delbouille et al. | 252/429 C X |
| 3,642,746 | 2/1972 | Kashiwa et al. | 252/429 B X |
| 3,859,231 | 1/1975 | Kochhar et al. | 252/429 B X |
| 3,953,414 | 4/1976 | Galli et al. | 252/429 C |

*Primary Examiner*—Patrick P. Garvin

[57] ABSTRACT

Supported catalysts for the high-yield polymerization of olefins to polymers which occur in spheroidal form are disclosed. The catalysts are prepared from starting components which comprise (a) organometallic compounds of metals belonging to Groups II or III of the Mendelyeev Periodic Table and (b) a product obtained by reacting a halogenated Ti compound with a Mg hydrate chloride in the form of spheroidal particles having controlled dimensions comprised between 10 and 70 microns.

7 Claims, No Drawings

CATALYSTS FOR POLYMERIZING OLEFINS TO SPHEROIDAL-FORM POLYMERS

THE PRIOR ART

Some examples of supported catalysts of the Ziegler-Natta type which yield polymers reproducing or "repeating" the geometrically defined shape of the particles of the starting catalysts are described in U.S. Pat. No. 3,594,330.

However, the catalysts of said patent, in spite of such repetition and the high resistance thereof to supersonic vibrations, yield polymer particles which are brittle and crumble during purification of the polymer from the catalyst residues and cake when subjected to compression.

The drawbacks mentioned have been overcome, at least in part, by employing the catalysts described in Italian Pat. No. 969,340, assigned to Montedison, S.p.A. The high-yield supported catalysts for the polymerization of olefins described in the latter patent are starting from a carrier consisting of Mg hydrate chloride previously molten and atomized according to conventional technologies and hot-reacted with $TiCl_4$. The product thus obtained constitutes the component that, when reacted with an organometallic compound of the metals of the 2nd or 3rd group of the Mendelyeev Periodic Table, provides the high-yield catalyst useful to polymerize olefins.

The olefin polymer obtained using the catalyst of the Italian patent exhibits a high resistance to crumbling when prepared by means of discontinuous polymerization processes, while it does not exhibit an equally satisfactory resistance to crumbling when it is obtained by means of a continuous process, in which both catalyst and polymer are subjected to transfers in suspension and through proportioning apparatuses and pumps, or when the polymer is subjected to centrifugation.

THE PRESENT INVENTION

One object of this invention is to provide new catalyst components which mixed with organometallic compounds of the Groups II and III metals give supported catalysts capable of polymerizing olefins to high yields of spheroidially-shaped particles which are highly resistant to crumbling even when the olefin polymerization is carried out on a continuous scale.

This and other objects are achieved by the present invention in accordance with which component (b) is prepared from a particular Mg hydrate chloride obtained by direct synthesis from electrolytic Mg and hydrochloric acid, either gaseous or in aqueous solution, followed by successive fractional crystallization of the reaction product.

One method of otaining the Mg hydrate chloride suitable for preparing the catalysts of the present invention is as follows: 700 kg of water, 1,200 kg of HCl and 150 kg of Mg gradually added are reacted. Since the reaction is exothermic, the temperature rises to 70–80° C. The solution obtained is cooled and filtered at room temperature, then concentrated at 60° C under vacuum (about 60 mm Hg) at 38 Baume. The concentrated solution is cooled down by crystallizing at 15–18° C and centrifuged. About 800 kg of $MgCl_2 \cdot 6H_2O$, (product reagent pure = =>99% purity) are obtained, corresponding to a yield of about 50%.

The salt of Mg hexahydrate as such or after successive drying to the tetrahydrate is atomized, after melting, so as to obtain spheroidal particles having controlled dimensions comprised between 10 and 70 microns, preferably between 20 and 50 microns, according to conventional technologies. Subsequently, the particles are partially dried up to a residual content of water of crystallization ranging from 10 to 45% by weight, preferably from 18 to 25% by weight, by employing conventional technologies that prevent caking of the particles and the formation of hydrolysis by-products of the Mg hydrate chloride.

The Mg hydrate chloride thus obtained is reacted with boiling $TiCl_4$ for about 1 hour. The resulting product is washed with $TiCl_4$ and subsequently with hydrocarbons until removal of the unreacted $TiCl_4$, to obtain component (b) of the present catalysts.

The dehydration step is conducted at temperatures ranging from 80° C to 110° C in order to pass from magnesium chloride hexahydrate to the tetrahydrate, and respectively from 130° C to 150° C to pass from the tetrahydrate to magnesium chloride having a water content comprised between 10 and 45%, preferably between 18 and 25% by weight.

The drying operations may be carried out, for example, by using driers allowing a mechanical removal of the material, in order to avoid caking phenomena, or fluidized bed driers, in which nitrogen is the fluidizing gas. The utilization of other drying techniques is not excluded, provided such techniques do not modify the purity of the starting magnesium chloride.

By operating under the aforesaid conditions, a product is obtained the Mg hydroxychloride content of which is generally lower than 1% by weight.

The catalysts of the present invention consist, therefore, of the product the starting components of which comprise:

(a) an organometallic compound of a metal belonging to the 2nd or 3rd group of the Mendelyeev Periodic Table, and (b) a product obtained by reacting a Ti halogenated compound with the Mg hydrate halide in the form of spheroidal particles having particle sizes comprised between 10 and 70 microns, said hydrate halide containing from 10 to 45% by weight of water and being obtained by partial dehydration of a Mg hydrate halide prepared by direct synthesis between electrolytic Mg and hydrochloric acid either gaseous or in aqueous solution, and by successive fractional crystallization of the synthesis product.

Component (b), which is also a particular object of this invention, is in the form of spheroidal particles having dimensions ranging from 10 to 70 microns.

The mechanical and morphological characteristics of such component are as follows:

resistance to supersonic vibrations comprised between 50 and 90 watt. h/l;

specific area comprised between 10 and 70 $m^2/g$; and mean radius of pores comprised between 30 and 150 A.

The resistance to supersonic vibrations has been measured by subjecting a suspension of the particles in anhydrous heptane, at a concentration of 2–3% by weight and contained in a glass test tube dipped into a water bath, to the action of supersonic vibrations.

Apparatuses having a specific power comprised between 10 and 80 watt/l, at a frequency of 22.4 and 45 $KH_z$, have been utilized as supersonic vibration sources. The specific power of the apparatus is expressed by the ratio: transducer power to volume of the liquid (through which the supersonic energy spreads) contained in a metal tank to which the transducer itself is applied. Each sample is subjected to successive treatments of increasing intensity (duration and power), until an almost thorough disaggregation of the particles is obtained. After said treatment, as well as after separation of most of the heptane, the samples are photographed under an optical microscope.

In preparing the catalysts of the present invention, the reaction between the halogenated Ti compound and Mg hydrate may be conducted in a wide temerature range. Preferably it is carried out at a temperature between 80° C and the boiling point of the liquid Ti compound, employing an excess of the liquid compound. In practice, the Mg hydrate halide is reacted in suspension in the Ti liquid compound. The solid reaction product is separated by hot filtering from the excess of Ti liquid compound, and then washed, always in hot conditions, with the fresh liquid compound and finally with inert hydrocarbon solvents (hexane, heptane, etc.), until thorough removal of the Ti compound not fixed on the carrier. The temperature of filtering and of washing with the fresh Ti compound is preferably comprised between 80° C and the boiling point of the liquid Ti compound.

The conditions under which the spheroidal particles form and the product dehydrates to the desired degree have been described.

Organometallic compounds of Al, such as Al-trialkyls, for example aluminum triethyl, aluminum triisobutyl, aluminum tri-n-butyl, aluminum trioctyl, etc., and halides of aluminum alkyl, such as aluminum diethyl monochloride, are preferably employed as component (a) of the catalysts. The Al/Ti atomic ratio used in preparing the catalyst may vary within a wide range. Preferably, it is comprised between 50:1 and 200:1.

When the catalysts of this invention are employed in the polymerization of alpha-olefins, i.e., olefins of the formula $CH_2=CHR$ in which R is an alkyl radical containing from 1 to 6 carbon atoms, in particular of propylene, it is advisable to treat component (b) with electron donor compounds either before or after contacting the Ti compound with the Mg hydrate halide.

The halide of Mg hydrate used as support in practicing the present invention may be employed in admixture with 20-80% by weight of co-carriers which are inert towards Mg halide and selected from the compounds of the elements belonging to Groups I to IV of the Mendelyeev Periodic Table. Some examples of such compounds which may be mixed with the Mg hydrate halide are $Na_2CO_3$, $Na_2SO_4$, $B_2O_3$.

The halogenated Ti compounds useful in preparing the catalysts according to this invention comprise, for instance, the halides, haloalcholholates, halo-amides, halo-titanates or titanites of ammonium, the Ti salts of halogenated organic acids. The liquid halogenated compounds of Ti, such as, for example, $TiCl_4$, $TiCl_2(OC_4H_9)_2$, $TiBr_4$, etc., are preferably employed. However, solid halogenated Ti compounds, such as $TiCl_3$, may also be used in the form of solutions of complexes thereof with electron-donor compounds in inert solvents.

The advantages realized by using the present catalysts include the fact that they can be used successfully in both continuous and discontinuous processes, thus permitting (1) to eliminate the granulation and drawing steps employed in the conventional processes for producing polyolefins, operations which weight heavily on the costs of the finished product, and, in consequence, (2) to avoid uncontrolled modifications in the distribution of the polymer molecular weights that occur in such steps, as well as any other modification of physical-mechanical and rheological characteristics which depend on the distribution of the molecular weights.

As already mentioned, the catalysts of the present invention are suitable to obtain spherical-form polymers resistant to crumbling and caking, starting from ethylene and/or from alpha-olefins, such as propylene, butene-1, 4-methyl-pentene-1, etc.

The polymerization of olefins in contact with the present catalysts conducted according to conventional methods, operating either in liquid phase (in the presence or in the absence of solvents other than the monomers to be polymerized), or in the gas phase.

The polymerization temperature generally ranges from 40° to 90° C and the pressure may be atmospheric pressure or higher.

The molecular weight of the polymers can be regulated according to conventional methods, for instance by using such known molecular weight regulators as hydrogen, zinc diethyl, etc.

The following examples are given to illustrate the invention in more detail but are not intended to be limiting.

EXAMPLE 1

Preparation of component (b)

$MgCl_2 \cdot 6H_2O$ prepared by direct synthesis from electrolytic magnesium and hydrochloric acid and subsequently purified by fractional crystallization, was sprayed, in molten condition, through a two-fluid nozzle in countercurrent with hot air in an equipment of the spray-cooling type manufactured by Messrs. Niro Atomizer. About 150 kg/h were sprayed through the nozzle and the inlet/outlet temperature was kept at 70°–78° C, thus obtaining a product consisting of spherical form particles whose average sizes were comprised between 25 and 40 microns.

1,200 g of the particles were dried at 90° c in a fluidized bed drier in which nitrogen was the drying medium and the linear velocity of such medium in the bed was of 0.12 m/sec. After 4 hours, $MgCl_2 \cdot 4H_2O$ was obtained, the water of crystallization content of which was controlled by the Karl Fischer method and through X-ray analysis. The product thus obtained was further dried in the same equipment and with the same nitrogen flow for a further 6 hours at 130° C. The product so dried had the following composition:
water: 18.25%
Mg: 20.9%
Cl: 61.5%
X-ray analysis: $MgCl_2 \cdot 1H_2O + MgCl_2 \cdot 2H_2O$.

The equipment used consisted of a pyrex glass reactor having a capacity of about 3 liters, equipped on the bottom with a sintered glass filtering plate. Heating was obtained by means of an electrical resistance wound around the lower tubular section of the reactor. Furthermore, the reactor was equipped with reflux cooler, stirrer, thermometer and anhydrous nitrogen surge circuit. The carrier in powder was fed through a nozzle by means of a test tube pressurizable with nitrogen. A glass flask, connected with the reactor bottom, collected the reaction and washing liquids of filtration, while another flask arranged sidewards and connected with the reactor top served to heat and to feed the washing liquids.

TiCl$_4$ was supported on the Mg hydrate chloride by introducing 50 g of the Mg hydrate cloride dried at 130° C and 2,000 cc of TiCl$_4$ at 80° C into the reactor, and by bringing the temperature to 136.5° C, that is to the TiCl$_4$ boiling point. Due to the reaction between water and TiCl$_4$ there was a strong evolution of HCl. The suspension was kept for 1 hour at the TiCl$_4$ boiling point under intense stirring. The TiCl$_4$ containing the by-products deriving from the reaction between water and TiCl$_4$ was hot filtered. Two hot washings with 1,500 cc of fresh TiCl$_4$ were carried out and successively further five washings with 600 cc of dearomatized and anhydrified heptane to remove the excess of TiCl$_4$ not bound to the carrier.

On chemical analysis of the supported catalytic component (b) dried under vacuum, the following results were obtained: Ti = 2.3%; Mg = 23.45%; Cl = 72.15%; H$_2$O = 1.4% (Karl Fischer method). The difference between the 99.30% found and 100% was due to the presence of heptane retained by the catalytic component. The surface area of supported component (b) was 25.34 m$^2$/g, the mean radius of the pores (r) was 84 A, and the total porosity was 0.1065 cm$^3$/g. The minimum specific supersonic energy necessary to bring about a thorough breaking of the particles, measured by apparatuses the specific power of which was comprised between 10 and 80 watt/liter at a frequency of 25.4 KH$_z$, was of 77 watt.h/liter.

Polymerization

Commponent (b) was suspended in dearomatized hexane at a concentration of 0.5 g/liter in a vassel equipped with a mechanical stirrer, along with component (a), in such amount as to have a concentration of said component (a) of 3 g/liter. By means of a particular proportioning device, this suspension was fed to polymerization reactor having a useful volume of 2,000 liters, along with hexane containing component (a) in such amount that, added to the amount already present in the catalytic suspension coming from the reactor, reached 2 g/liter. The polymerization reactor, kept at a temperature of 80° C, was hourly fed with a mixture having the following composition: 100 l of hexane, 2 g/l of component (a), 0.037 g/l of component (b) and 36 kg/h of ethylene. The reaction temperature was 80° C. The average residence time in the reactor was about 9 hours. The molecular weight was adjusted with hydrogen so as to obtain a polymer having a melt index E, determined at 190° C on 2.160 kg according to ASTM D 1238, ranging from 4 to 6 grams/10 minutes. The polymer yield was 460,000 grams/g of titanium. The polymer, after centrifugation, was dried from the solvent according to conventional technologies, and was directly feedable to the processing machines without previous granulation. In fact, the polymer was free from particles having diameters below 150 microns, and the average particle diameter was around 750 microns.

20 g of the polymer obtained, along with 2 porcelain balls having a diameter of 25 mm, were introduced into a metal cylinder (inside diameter = 38 mm, length = 160 mm), equipped with a metal plug horizontally fixed on a truck having a 50 mm travel and subjected to 250 oscillations/minute for 20 minutes. Then the particle size of the polymer subjected to the crumbling resistance test was compared (on sieves of series ASTM Nos. 4, 7, 10, 18, 35 and 70) with that of the polymer not subjected to said oscillations. From this comparison, it resulted that no sensible variation in the granulometric distribution of the oscillated and non-oscillated polymer was noticed.

To evaluate the impact strength, four tablets of about 10 grams were prepared from the polymer obtained according to this example, by compression at 394 kg/cm$^2$ in a cylindrical die (diameter = 18 mm). These tablets, subjected for 6 minutes to the same treatment used to determine the crumbling resistance, disintegrated almost thoroughly, yielding deformed polymer particles, which, however, exhibited nearly the same dimensions as the orginal particles.

EXAMPLE 2

Catalyst-forming component (b) was obtained according to the modalities described in Example 1, and was found to have the same composition.

800 cc of heptane containing 1.6 g of aluminum triisobutyl were introduced into a stainless steel 1.5-liter autoclave equipped with blade stirrer, oil circuit heating system and water circuit cooling system. The temperature was raised to approx. 75° C, whereupon — in a nitrogen atmosphere — catalytic component (b) dispersed in 20 cc of heptane was introduced. The introduced amount was of 0.021 g corresponding to 0.483 × 10$^{-3}$ g of Ti. Subsequently, 7.5 kg/cm$^2$ of hydrogen and 6 kg/cm$^2$ of ethylene were introduced, while the temperature was raised to 80° C. The pressure was kept constant by continuous feeding of ethylene. Polymerization was conducted for 4 hours and, after degassing and cooling, 220 grams of polyethylene were discharged. The yield was 467,000 g/g of Ti.

EXAMPLE 3

Preparation of component (b)

Magnesium chloride hydrate in spherical form was prepared in a vitrified 16-liter autoclave, provided with an outlet on the bottom and relevant valve, jacketed and heated by means of an oil circuit, equipped with stirrer, thermocouple for taking the temperature and pressure gauges. A spray nozzle (diameter = 0.34 mm) heated by the autoclave oil circuit was arranged under the discharge valve. 10 kg of magnesium chloride tetrahydrate, obtained by dryng in an oven MgCl$_2$·6H$_2$O prepared according to the modalities of Example 1, were introduced into the autoclave. It was molten and brought to a temperature of 200° C. By introducing nitrogen into the autoclave, the pressure was brought to 25 atm., and the molten MgCl$_2$·4H$_2$O was sprayed through the nozzle. The product so atomized was collected in a vessel containing dearomatized anhydrous heptane, closed and in a nitrogen atmosphere.

Successively, the solid product was separated from the solvent, dried in an oven in a nitrogen flow at a temperature of from 70° to 80° C and then screened in order to gather the fraction having particle sizes below 50 microns. 1,000 g of this product were dried in a fluidized bed at 130° C according to the modalities described in Example 1. The dried product had a residual water content of 18.5% by weight.

50 g of the dried product were reacted with 2,000 cc of TiCl$_4$, initially at 80° C. The suspension was then brought to the boiling point of TiCl$_4$ and kept at such temperature for 1 hour. The filtering and washing operation was completed following the modalities of Example 1. Discharge component (b) was found to have the following composition: Ti = 1.85%; Mg = 23.25%; Cl = 72.65%; H$_2$O = 1.8% (Karl Fischer method). The difference between the 99.55% found and 100% was due to the presence of heptane retained by the catalytic component.

The surface area was 20.7 m$^2$/g, the mean radius of the pores was 109 A and the total porosity was 0.1095 cm$^3$/g. The minimum specific supersonic energy necessary to bring about a thorough breaking of the particles was higher than 77 watt. h/liter.

Polymerization

Polymerization of ethylene was conducted according to the modalities and using the apparatus described in Example 1. The composition of the mixture hourly fed to the polymerization reactor was as follows: 100 l of hexane, 2 g/l of component (a), 0.046 g/l of component (b) and 36 kg/h of ethylene. The other operative conditions were like those illustrated in Example 1.

The polymer yield was of 520,000 g/g of Ti. The polymer obtained was subjected to impact and crumbling resistance tests and exhibited a behavior the same as that of the polymer of Example 1.

EXAMPLE 4

Preparation of component (b)

Starting from MgCl$_2$19 6H$_2$O as described in Example 1, using the apparatus described in Example 3 and operating at a temperature of 140° C, atomization was effected under a nitrogen pressure of 25 atm.

The atomized product was collected in a tank containing dearomatized anhydrous heptane, closed and in a nitrogen atmosphere. The solid product was then separated from the solvent, dried in an oven and screened in order to collect the fraction having particle sizes below 50 microns. 1,200 g of this product were dried at 90° C for 4 hours in a fluidized bed drier according to the modalities of Example 1. The product so obtained was further dried in the same apparatus and with the same nitrogen flow for 2 hours at 130° C. The resulting product had a residual water content equal to 33.9% by weight.

The TiCl$_4$ supporting reaction was conducted following the procedure of Example 1, thus obtaining a component (b) having the following composition: Ti = 3.05%; Mg = 20.15%; Cl = 72.15%; H$_2$O = 1.85% (Karl Fischer method). The difference between the 99.55% found and 100% was due to the presence of heptane retained by the catalytic component.

The surface area was 78.6 m$^2$/g, the mean radius of the pores (r) was 29.2 A and the total porosity was 0.1147 cm$^3$/g. The minimum specific supersonic energy required to cause a thorough breaking of the particles was 38.5 watt.h/l.

Polymerization

Polymerization of ethylene was conducted according to the modalities reported in Example 2, 220 g of polyethylene, corresponding to a yield of 345,000 g/g of Ti, were obtained. The polymer, subjected to the crumbling and impact tests, substantially behaved like the polymer of Example 1.

EXAMPLE 5

The component (b) used herein is the same as that of Example 1. With this component, complexed with an electron-donor specified infra, there were carried out runs on the polymerization of propylene in liquid propylene as the polymerization diluent, with or without hydrogen as molecular weight regulator.

Polymerization with hydrogen

Into a stainless steel 40 liter autoclave, fitted with a blade and counterblade stirrer and with a water-steam heating sleeve, there were introduced, at room temperature in a propylene current, 12.5 g of triethyl aluminum dissolved in 200 cc of heptane preliminarly admixed with 72 grams of paraethylanisate (PEA), so that the molar ratio triethyl aluminum/PEA equals 2.74.

Thereupon, there were introduced 8 kg of liquid propylene and then, under stirring, by means of a bottle, 0.968 g of component (b) prepared according to Example 1, suspended in 150 cc of heptane, and by using for the introduction 2 kg of liquid propylene.

Into the autoclave were then introduced 3 Nlt of hydrogen. The temperature in the autoclave was brought rapidly up to 65° C. The polymerization reaction was carried on for 5 hours and at the end the unreacted propylene was evaporated. There were thus obtained 3.6 kg of polypropylene, corresponding to 160,000 g/g Ti.

The total polymerizate was extracted with boiling n-heptane to determine its content of isotactic polypropylene, which proved to be 71%. The intrinsic viscosity [η] was 1.3, while the flexural rigidity amounted to 10,500 kg/sq.cm.

The polymer, in the form of spheroidal particles, with an average diameter of around 700 microns, on being submitted to crumbling and compacting resistance, behaved like the polymer of Example 1.

Polymerization without hydrogen

The foregoing test was repeated, except that no hydrogen was used as molecular weight regulator. Thereby were obtained 3.2 kg of polypropylene, corresponding to a yield of about 140,000 g/g Ti, said polypropylene showing an isotacticity index of 81 and an [η] = 2.4 dl/g.

The product, subjected to compacting and crumbling resistance tests, behaved in the same way as the products obtained in the previous Examples.

In Examples 1, 3 and 4, the component (a) was aluminum triisobutyl.

What we claim is:

1. Components of magnesium halide-supported catalysts for polymerizing olefins to spheroidally shaped polymers highly resistant to crumbling, which components comprise the product of reaction between (A) a hydrated Mg halide in the form of spheroidal particles having a particle size of from 10 to 70 microns, and containing from 10% to 45% by weight of crystallization water, and (B) a halogenated titanium compound selected from the group consisting of halides, haloalcoholates and the Ti salts of halogenated oganic acids, said components having a particle size of from 10 and 70 microns and being further characterized in showing a resistance to supersonic vibrations of 50 to 90 Watt. h/l., a specific area of from 10 to 70 m$^2$/g., and a mean radius of the pores of from 30 to 150 A.

2. In the process for preparing the components of claim 1 for use in catalysts for polymerizing olefins to spheroidally shaped polymers highly resistant to crumbling, which process comprises atomizing a hydrated magnesium chloride to obtain spheroidal particles having controlled dimensions comprised between 10 and 70 microns, partially dehydrating said particles and then reacting them with a halogenated Ti compound selected from the group consisting of halides, haloalcoholates and the Ti salts of halogenated organic acids, at temperatures ranging from 80° C to the boiling point of the Ti compound, filtering the resulting solid reaction product and washing it with a hot liquid Ti compound selected from said group consisting of the halides, haloalcoholates and Ti salts of halogenated organic acids, at a temperature of from 80° C to the boiling point of the Ti compound, the improvement consisting of preparing the hydrated magnesium chloride (1) by direct synthesis between electrolytic magnesium and either gaseous hydrochloric acid or an aqueous solution thereof, or (2) by successive fractional crystallization of the synthesis product consisting of hydrated magnesium chloride and then (3) by partial dehydration of said hydrated magnesium chloride until the water of crystallization content thereof is from 10% to 45% by weight.

3. Catalysts for the polymerization of olefins to substantially crush resistant spheroidally-shaped particles and which comprise the product obtained by mixing starting components which comprise:
   (a) an organometallic compound of aluminum selected from the group consisting of Altrialkyls and Al alkyl halides and
   (b) the product of reaction between (A) a hydrated Mg halide in the form of spheroidal particles having a particle size of from 10 to 70 microns and containing from 10% to 45% by weight of crystallization water, and (B) a halogenated Ti compound selected from the group consisting of halides, haloalcoholates and the Ti salts of halogenated organic acids, said component (b) having a particle size of from 10 to 70 microns and characterized in showing a resistance to supersonic vibrations comprised between 50 and 90 Watt. h/l., a specific area comprised between 10 and 70 $m^2/g$ and a mean radius of the pores comprised between 30 and 150 A.

4. Catalysts according to claim 3, in which the liquid Ti compound used in preparing component (b) of the catalyst is $TiCl_4$.

5. Components of catalysts for polymerizing olefins to spheroidally shaped polymers highly resistant to crumbling, comprising the product of reaction between (A) a hydrated magnesium chloride atomized to form spheroidal particles having controlled dimensions between 10 and 70 microns and (B) titanium tetrachloride, said components being characterized in that the hydrated magnesium chloride is prepared (1) by direct synthesis between electrolytic magnesium and gaseous hydrochloric acid or an aqueous solution thereof, or (2) by successive fractional crystallization of the synthesis product consisting of hydrated magnesium chloride followed by partial dehydration of said hydrated magnesium chloride until the residual water of crystallization content thereof is from 10% to 45% by weight.

6. Components of catalysts for polymerizing olefins to polymers having a spheroidal shape according to claim 5, characterized in that the hydrated Mg chloride comprises from 18 to 25% by weight of water.

7. Components of catalysts according to claim 5, in which the amount of the Ti compound contained in the components, expressed as Ti metal, is comprised between 0.1 and 20% by weight.

* * * * *